Jan. 20, 1925.  
W. N. GOODWIN, JR  
1,523,803

GROUND DETECTOR

Filed Aug. 10, 1920  6 Sheets-Sheet 1

Inventor  
William N. Goodwin, Jr.  
By Byrnes Townsend & Bickenstein  
Attorneys Jan. 20, 1925.
W. N. GOODWIN, JR
1,523,803
GROUND DETECTOR
Filed Aug. 10, 1920  6 Sheets-Sheet 2
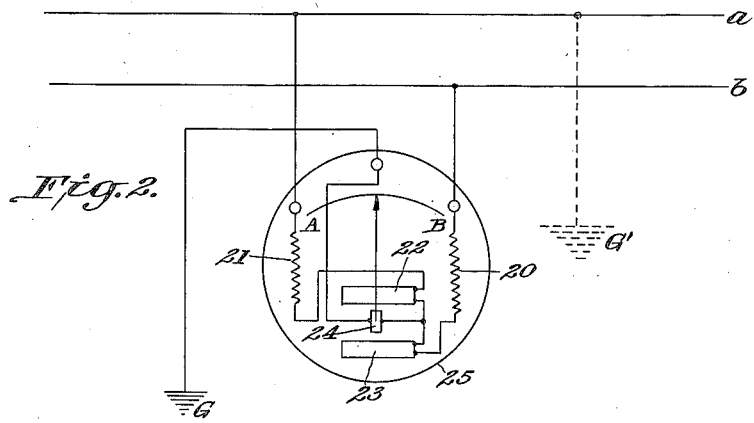
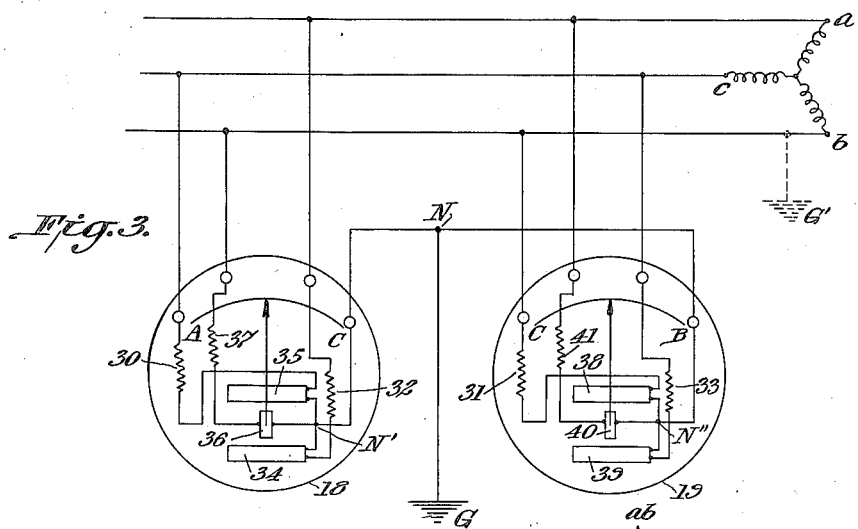
Inventor
William N. Goodwin, Jr.
By Byrnes Townsend & Brickenstein
Attorneys

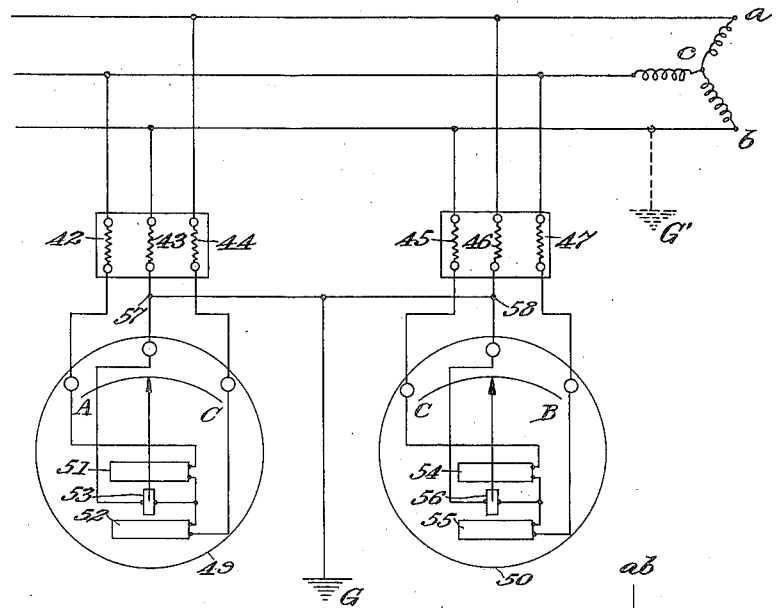
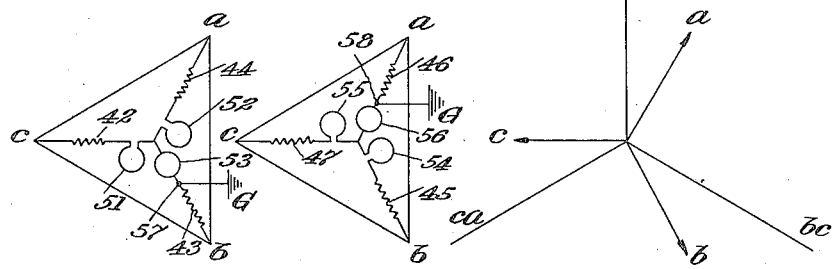
Fig. 7. Fig. 8. Fig. 9. Fig. 10.

Jan. 20, 1925.

W. N. GOODWIN, JR 1,523,803

GROUND DETECTOR

Filed Aug. 10, 1920 6 Sheets-Sheet 5

Inventor
William N. Goodwin, Jr.
By Byrnes Townsend Brickenstein
Attorneys

Patented Jan. 20, 1925.

1,523,803

UNITED STATES PATENT OFFICE.

WILLIAM NELSON GOODWIN, JR., OF NEWARK, NEW JERSEY, ASSIGNOR TO WESTON ELECTRICAL INSTRUMENT COMPANY, OF NEWARK, N. J., A CORPORATION OF NEW JERSEY.

GROUND DETECTOR.

Application filed August 10, 1920. Serial No. 402,560.

*To all whom it may concern:*

Be it known that I, WILLIAM NELSON GOODWIN, Jr., a citizen of the United States, residing at Newark, in the county of Essex and State of New Jersey, have invented certain new and useful Improvements in Ground Detectors, of which the following is a specification.

The present invention relates to ground detectors and leakage indicators for single phase and polyphase circuits.

Ground detectors in use on A. C. circuits have heretofore been principally those which operate on the electro-static principle. While this type of instrument is readily adaptable for use on very high voltage circuits, they do not lend themselves easily for use on comparatively low voltage circuits, for example, 6600 volts and under, on account of lack of torque and consequent delicacy of construction.

It is the object of the invention to produce instruments for use as ground detectors or leakage indicators on A. C. circuits, both single and polyphase, by which not only the fact that a ground on any line of a system exists is announced but also that the value or amount of a ground is indicated on its very incipiency, so that proper steps may be taken to locate and remedy the fault on a line in time, before the deterioration or general breakdown of the system is completed and great damage caused.

The instrument for carrying out the objects of my invention consists broadly of two coils carrying current, one of which may be movable and may be caused to rotate by the action of the current in the fixed coil upon it; or both coils may be fixed and cause rotation in a movable third conductor by the interaction of the currents in the two coils upon the current induced in the third conductor by them, as in the well known rotating disc watthour meter. In the simpler form of instrument consisting of fixed and movable coils, the motion of the movable coil is controlled by springs or other restoring means by the action of which, the pointer, which is attached to the movable coil, stands normally at a definite part of the scale, usually at the center.

For a fuller understanding of the invention, reference is had to the appended drawings, in which—

Fig. 2 is a diagrammatic view of a modification of the device for single phase circuits;

Fig. 3 is a diagrammatic view of the application of my invention to three phase circuits;

Figure 11:
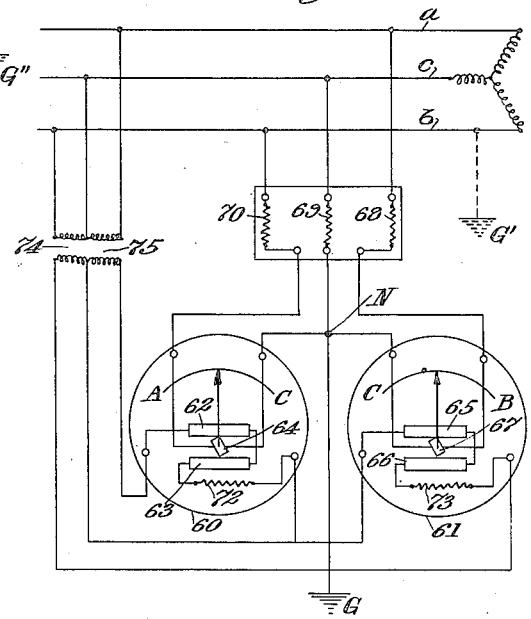
Figure 12:
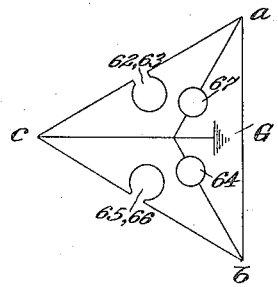
Figure 13:
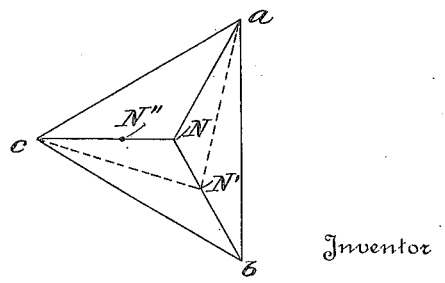
Figure 14:
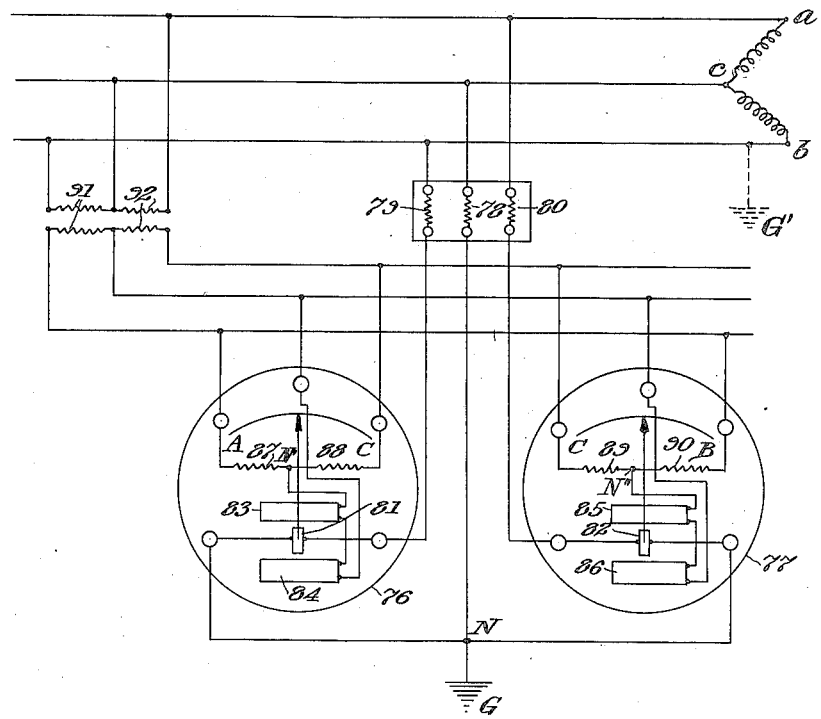
Figure 15:
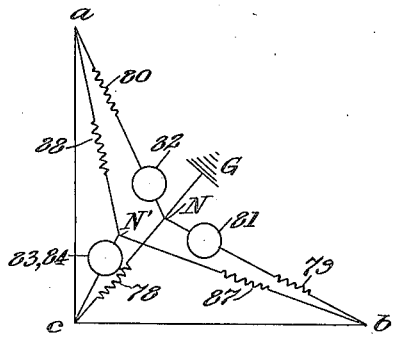
Figure 16:
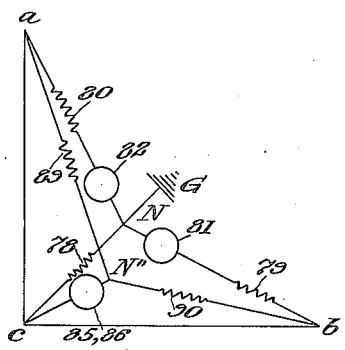
Figure 17:
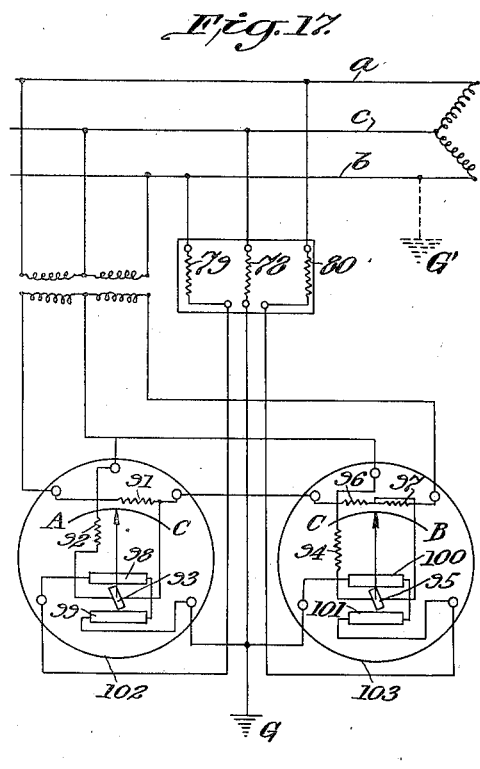
Figure 19:
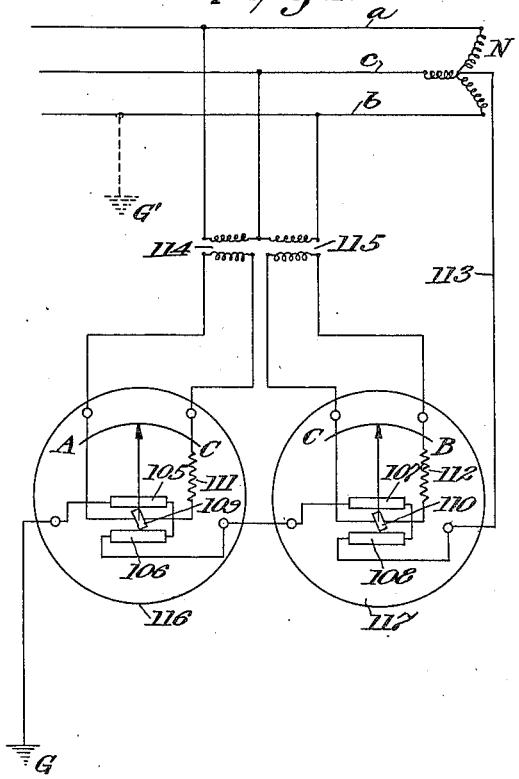
Figure 18:
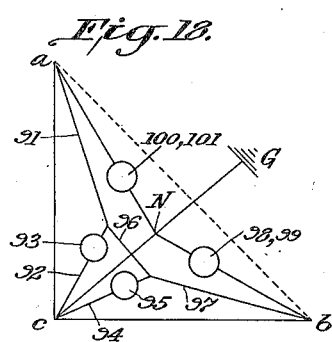
Figure 20:
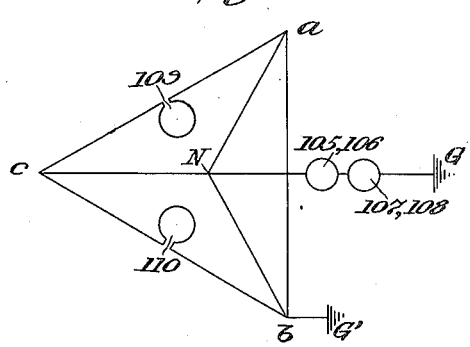
Figure 21:
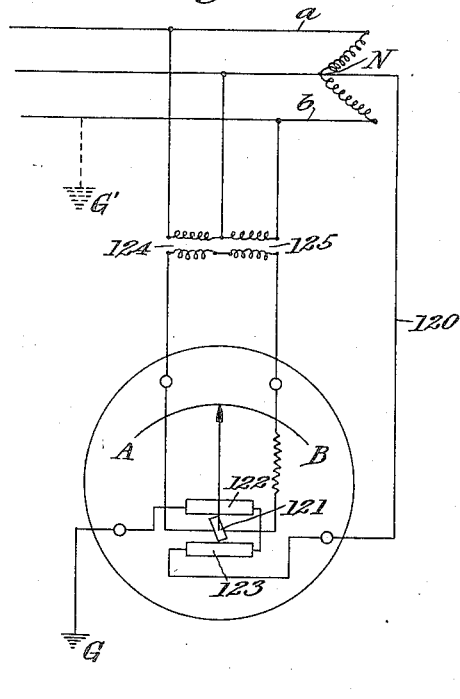
Figure 23:
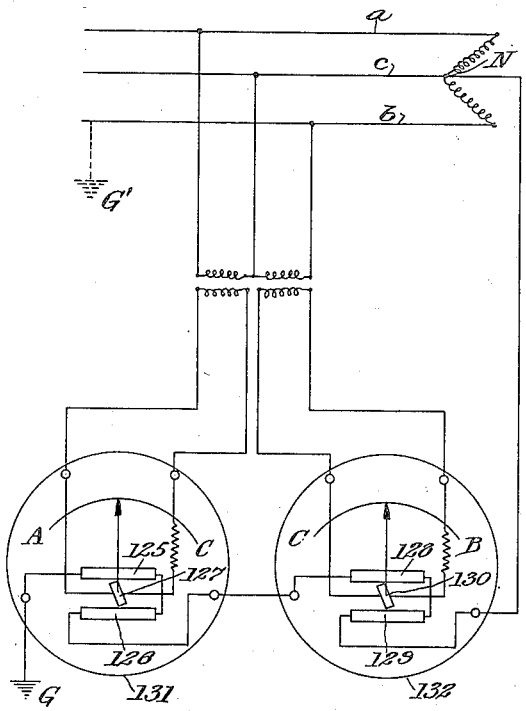
Figure 22:
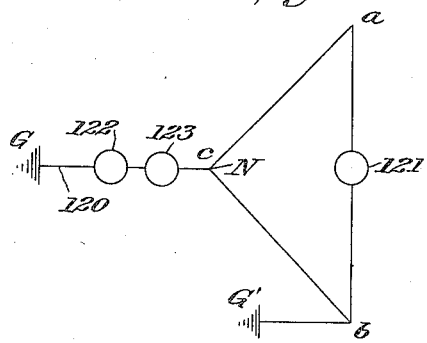
Figure 24:
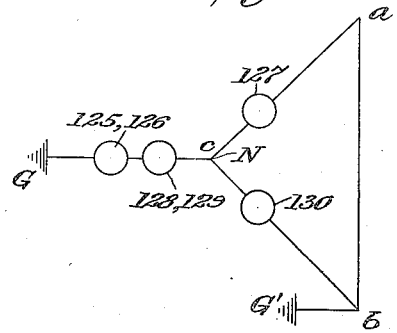

Figs. 4, 5, and 6 are circuit and vector diagrams explanatory of Fig. 3;

Figs. 7 to 10 inclusive show a modification, with explanatory circuit and vector diagrams, of the device for indicating grounds on three phase circuits;

Figs. 11 to 13 inclusive show still another modification, with circuit and vector diagrams, of my invention for use on three phase circuits;

Figs. 14, 15, and 16 show a diagrammatic view, and explanatory circuit and vector diagrams, of the application of my invention for indicating grounds on two phase circuits;

Figs. 17 and 18 show a diagrammatic view, and explanatory vector diagram respectively of a modification of the device shown in Fig. 14 for use on two phase circuits;

Figs. 19 and 20 show a diagrammatic view of the application of my invention as a leakage indicator to three phase circuits having a grounded neutral;

Figs. 21 and 22 show similar views of a leakage indicator for two phase circuits having the common wire grounded;

Figs. 23 and 24 illustrate a modification of the leakage indicator, illustrated in Fig. 21, for use on two phase circuits having the common wire grounded;

In all devices shown in Figs. 1–24 inclusive the electrodynamometer form of instrument is used and in all the methods employed either the actual neutral, if any, is grounded or an artificial neutral is formed in such a manner that all of the conductors comprising the line circuit when free from grounds have the same, or approximately the same potential relative to this neutral point which is grounded.

Figure 1:
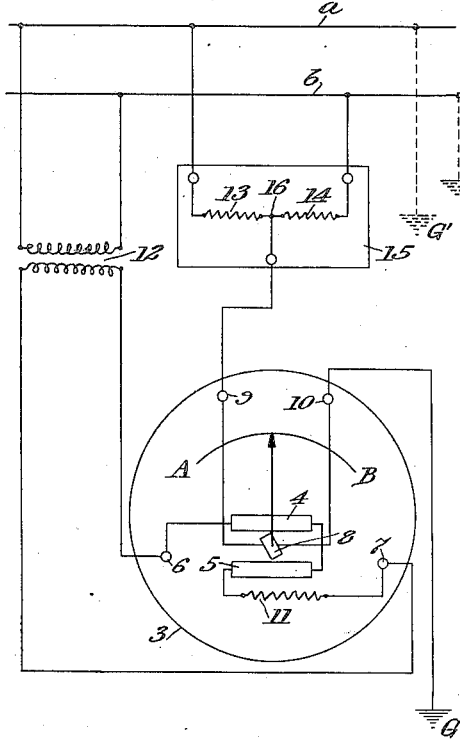
Fig. 1 is a diagrammatic representation of a ground detector embodying my invention for indicating a ground on a single phase circuit.

Having now reference to Fig. 1, $a$ and $b$ are the two lines of a single phase circuit. The instrument 3 comprises field coils 4 and 5 terminating in binding posts 6 and 7 and a movable coil 8 terminating in binding posts 9 and 10. The resistance of the field coil circuit is so adjusted by the resistor 11 that it may be directly connected to the line for low voltage circuits or through a transformer 12 for voltages higher than those for which the insulation of the instrument was designed.

One terminal of the movable coil circuit, as for instance, the terminal 10, is connected to the ground indicated by the letter G. This connection may be made permanently, as shown, or through a switch or plug (not shown), as desired. The other terminal, 9, is connected to the middle point of a resistor 13, 14 which is connected directly across the line as shown. This resistor may be self-contained in the instrument case, for low voltage circuits, or in an external box 15, for higher voltages. The instrument then becomes an A. C. voltmeter or galvanometer with separately excited fields.

The operation of the instrument is as follows: When the lines are perfectly insulated, no current will flow through the movable coil circuit and consequently no torque will be produced. The pointer will therefore remain at zero. When, however, a ground exists for example on line $a$ as indicated by $G_1$, the current passes down through $G_1$ up through the ground G through the movable coil circuit to the midde point 16 and then through the resistor 14 to the line $b$. This current deflects the pointer to one side, the direction of the deflection depending on the construction of the instrument. When the line $b$ is grounded the current passes from line $a$ through resistor 13 and the movable coil to the ground through G to the ground G'' on the line $b$ back to the circuit. The relative direction of the current in the movable coil is reversed from that due to a ground on $a$ and the pointer deflects to the opposite side of the scale. The magnitude of the deflection will be a measure of the nature of the ground. The instrument is usually so adjusted that with a dead ground the needle will swing to the extreme end of the scale.

The electrodynamometer has the great advantage over an ordinary voltmeter in that the scale in a properly designed instrument is uniform and not congested near zero.

On account of the particular method of connection, the indications of the instrument will not be affected by the electrostatic capacity of the lines and therefore no "phantom grounds" will be indicated, as is the case when an ordinary voltmeter is connected upon a line to ground. The field and movable coil circuits may be interchanged without in any way changing the theory of the instrument.

The method just described for single phase circuits is based on the bridge principle. The instrument acts as a separately excited galvanometer bridged to ground from the neutral point 16. Any ground occurring unbalances the bridge by shunting one arm, which causes a current to pass to ground through the galvanometer.

Fig. 2 illustrates another modification of ground detector applied to single phase circuits, in which the two sections of the field coils are connected in divided circuits one in each circuit, and so arranged as to act differentially on the movable coil instead of being connected directly in series and acting as a unit as in Fig. 1.

Referring to the figure, the circuit through the instrument, is from line $a$ to the resistor 21, thence to section 22 of the field coil, thence to section 23 of the field coil, through resistor 20, and to line $b$. The movable coil is connected to the conductor joining field coil sections 22 and 23 and is connected through a binding post to ground G as shown. The field coil sections are wound in such a direction and so connected that a current through section 22 and movable coil 24 will deflect the pointer in one direction for instance toward the end of the scale marked B; and current through section 23 and the movable coil, will deflect the pointer in the opposite direction, for instance toward A.

The operation of indicating a ground is as follows: When no ground exists in either line, no current passes to ground through the movable coil and hence the pointer remains at zero. When for example the line $a$ is grounded as at $G_1$ as shown in dotted lines, then current passes from line $b$ through field coil 23 and movable coil 24 to ground producing a deflection toward the end of the scale marked A indicating a ground on $a$. The instrument is so adjusted in practice that in case of a dead ground, the pointer deflects to the end of the scale. A partial ground gives a correspondingly less deflection. In a similar manner if line $b$ is grounded, current passes from line $a$ through field coil 22 and movable coil 24 to ground, causing a deflection toward the end of the scale marked B.

The instrument may have the resistors 20 and 21 contained in the instrument case 25, or when used for high voltages, or for other reasons, may be partly or wholly contained in an external box (not shown). A switch (not shown) may be used to complete the ground connection to G when observations are being taken if it is not desirable to have the system continuously grounded.

Fig. 3 shows the application of my invention to a three phase A. C. circuit. For this purpose two electrodynamometer movements are required each having two field coil sections and a movable coil very similar to that shown in Fig. 2 for single phase circuits.

The two movements are shown as two separate instruments 18 and 19, but these movements may be contained in one case if desired. Artificial neutrals N' and N'' are formed in each instrument at the junction of three equal resistors, the other ends of the resistors being connected to the lines $a$, $b$, and $c$ one to each line. In instrument 18, the resistor 32 connected to line $a$ includes one section of the field coil 34, the resistor 30 connected to line $c$ includes section 35 of the field coil, the movable coil 36 being included in the resistor 37 connected to line $b$. The neutral point N' is connected through a binding post to ground G. In instrument 19, the resistor 31 connected to line $b$ includes field coil section 38; the resistor 33 connected to line $c$ includes field coil section 39, the movable coil 40 being included in the resistor 41 connected to line $a$. The neutral point N'' is connected through a binding post to ground G. The two neutral points N' and N'' may be interconnected by a conductor having a single ground connection at N.

Figs. 4 and 5 show the connections in instruments 18 and 19 respectively, which more clearly show the circuit relations to the three phase lines $a$, $b$, and $c$. Fig. 6 is the vector diagram showing the voltages acting on the various parts of the net-work, in phase and amount. The parts in these diagrams are designated by corresponding numbers to facilitate comparison. The field coil sections are so wound and connected that if currents in the same phase, or which have components in phase pass through section 35 and movable coil 36 in instrument 18, the pointer will deflect toward one end of the scale, which as actually constructed is toward C. Also, currents in phase or which have components in phase passing through section 34 and movable coil 36, deflect the pointer toward the other end of the scale, that is toward A. In a similar manner in instrument 19 currents in phase or having components in phase passing through field coil section 38 and movable coil 40, deflect the pointer toward the end of the scale marked B, and currents having components in phase passing through section 39 and movable coil 40, deflect the pointer to the end of the scale marked C.

The operation of indicating a ground is as follows: Assume first that no ground exists on any of the lines. The currents in the three circuits of each instrument are equal, and differ in phase by 120°, as is shown in Figs. 4, 5, and 6 so that the actions of the two field coil sections upon the movable coil of each instrument are equal and by construction opposite, which results in the pointer remaining at the zero position. If a ground exists for instance on line $b$ at $G_1$, then the resistor 37 including the movable coil 36 of instrument 18 is short circuited or partly short circuited according to the nature of the ground; since, however, the currents in the two field coil sections while varying in phase and magnitude, remain equal to each other, and symmetrical in phase relative to the current in the movable coil circuit, they produce equal but opposite effects upon the movable coil causing it to remain at the zero position.

In instrument 19, resistor 31 including the field coil section 38 is short circuited or partially short circuited, according to the nature of the ground, which causes the field coil 39 to have a preponderating effect upon the movable coil. When the phase relations of the currents in these two coils are considered it is seen that a deflection toward the end of the scale marked B results, thus indicating a ground on line $b$. In a similar manner, if a ground occurs on line $a$, then the pointer on instrument 19 remains stationary and that on instrument 18 deflects toward the end of the scale marked A. If, however, a ground occurs on line C, the resistor 30 including field coil section 35 is short circuited or partially so, causing the current in field coil 34 acting upon that in the movable coil 36, at the phase relations shown, to deflect the pointer toward the end of the scale marked C. In instrument 19, the resistor 33 including the field coil 39 is short or partly short circuited so that the current in field coil 38 acting upon that in the movable coil 40 causes a deflection toward C, as is seen by considering the phase relations. Thus a ground in line $c$ is indicated on both instruments.

The resistors shown may be all self-contained in the instrument case or if desired may be placed partly or wholly in an external box (not shown).

If it is not desirable to have the system grounded continuously at the connection G, a switch (not shown) may be used to complete the ground connection when observations are being made.

Figure 7 shows diagrammatically another modification of the application of my invention to three phase circuits. The construction of the instrument is the same as that shown in Fig. 3 just described except that the ground connection is not made to the theoretical neutral point, but as shown in Figs. 8 and 9, just outside of the movable coils, at the points 57 and 58 respectively so that the ground potential differs from the true neutral potential by the difference of potential across the movable coil which can be made very small, and for practical purposes will cause no appreciable error. Fig. 10 shows the vector relations of the circuits.

The resistors 42, 43, 44, and 45, 46, 47 are shown in an external box, thus making necessary only three binding posts. They may be self-contained in the instrument case if desired by adding another binding post to each instrument. Further, the two movements may be mounted in a common case if desired.

The operation of indicating a ground is very similar to that described above for Fig. 2, for example, if no ground exists on any of the lines, then on account of the equality of the currents in the two field windings of each instrument, and the symmetry of their phases relative to that of the current in the movable coil, the field coils by construction, have an equal and opposite effect on the movable coil, and on deflection results. If line $b$ is grounded as shown at $G_1$, then the resistor 43, of instrument 49 is short circuit or partially so, since, however, the currents in field coils 51 and 52, although changing in phase and amount, remain equal and maintain their phases symmetrical relative to that of the current in the movable coil 53, no deflection results, the pointer remaining on zero. In instrument 50, the resistor 45 including the field coil 54 is in effect shunted through the ground by the movable coil 56, which has a relatively low resistance. This causes the current in field coil 55 to have a preponderating effect on that in the movable coil 56, which produces a deflection of the pointer toward the end of the scale marked B, indicating a ground on line $b$. In a similar manner when line $a$ is grounded the pointer in instrument 50 remains stationary while that in instrument 49 moves toward the end of the scale marked A, indicating a ground on A. When line $c$ is grounded, the resistor 42 including field coil 51 in instrument 49 is shunted by the movable coil 53 through the ground, and the pointer is deflected toward the end of the scale marked C, by the action of the unbalanced current in field coil 52 upon that in the movable coil 53, and in instrument 50, the resistor 47 including field coil section 55 is shunted by the movable coil 56, causing the pointer to deflect toward the end of the scale marked C, by the unbalanced action of the current in field section 54 upon that in the movable coil 56. Thus a ground on line $c$ is indicated upon both instruments simultaneously.

Fig. 11 shows still another modification of my invention applied to a three phase A. C. circuit. For this purpose two electrodynamometer movements similar to that shown in Fig. 1, used for one of the methods for single phase ground detection, in which both field coil sections act as a unit upon the movable coil. Connections are so made that when no grounds exist, the currents in the field and movable coils are in quadrature, and the pointers remain stationary, but when a ground occurs the phases are caused to differ from the quadrature relation causing a deflection of the pointers in the proper direction, as shown in the following description. The instrument 60 comprises the field coil sections 62 and 63, and the movable coil 64. The instrument 61 comprises the field coil sections 65 and 66, and the movable coil 67. The two sections of field coil in each instrument may be wound as a single coil if the construction permits, or is desired. An artificial neutral point is established by providing three equal resistors 68, 69, and 70. Resistors 68 and 70 are understood to include the movable coils 67 and 64 respectively.

These resistors may be contained in an external box as shown, or wholly or partly inside the instrument case. One end of each resistor is connected to one of the lines and the other ends are joined together at the common junction N.

The neutral point N is connected to ground.

The field coil circuit of the instrument 60 is excited by the line voltage between the lines $a$ and $c$ and that of instrument 61 by the line voltage $b$, $c$. These circuits contain resistors 72 and 73 respectively so calculated that the circuits may be connected directly to the lines or through potential transformers such as 74, 75 if the line voltage is higher than the instruments are designed for.

The operation of the instruments may be better understood by referring to the circuit and vector diagrams in Figs. 12 and 13 respectively. Under normal conditions, with the lines perfectly insulated, the phase relations are as shown. From the principle of the three phase circuit, the phases of the currents in the three resistors 68, 69 and 70 are 120° apart. The current in the movable coil of each instrument is in quadrature with the currents passing through their respective field coils, since these currents are in phase with the voltages N$a$, and $cb$ respectively, for the instrument 61, and N$b$, and $ac$ respectively for the instrument 60. Since these currents are in quadrature, no torque can be produced on the movable coils and therefore no deflection results. As soon, however, as a ground occurs on any line, for example at $G_1$, on line $b$ the ground resistance lies in parallel with the resistor 70 and shifts the artificial neutral to a new point N' without changing the phase of the current in the movable coil 64. No deflection results in instrument 60. However, on account of the shifted phase of N'$a$ which is no longer in quadrature with $bc$, the field and movable coils are so wound that with the current phase relations as shown, a deflection occurs on instrument 61 toward the end of the scale marked B, indicating that line $b$ is grounded. In a similar manner, if $a$ is grounded, no deflection occurs on instrument 61, but the pointer in instrument 60 is deflected toward the end of the scale marked A.

When the line $c$ is grounded, the neutral point $N''$ is shifted outward on the line $Nc$ which changes the phases of the currents in both movable coils 64 and 67 alike, causing a simultaneous deflection of the instruments toward the ends of the scales marked C. In every case then the instruments not only indicate the value of the ground, but also just which line is grounded.

As in the case of the single phase instrument, the electrostatic capacity of the lines to the ground has no effect on the indications.

The field and movable coil in each instrument may be interchanged without any change in the theory of operation.

In the instrument just described the presence of a ground is indicated on any line by the displacement of line potential relative to an artificial neutral which has at all times the potential of ground. The connections are so designed as to make the instruments selective in their operation.

In Fig. 14 is represented the application of my invention to a two phase three wire circuit. In a manner similar to the arrangement in the three phase instrument an artificial neutral is obtained at a point having the same potential to ground as would naturally occur considering the capacitances of the lines to ground as being equal. This is produced by connecting one end of each of three equal resistors to each line and joining the other ends at a common point which becomes the neutral point.

Two instruments or elements are required for the complete ground detector, one instrument 76 shows when line $a$ is grounded, the other instrument 77 when line $b$ is grounded. Both instruments together show when line $c$ is grounded.

The neutral point N, which is connected to ground G is formed by the three equal resistors 78, 79, and 80. The resistor 79 includes the movable coil 81 of instrument 76 and the resistor 80 includes the movable coil 82 of instrument 77. In instrument 76, one end of the field coils 83, 84 is connected to line $c$ through the potential transformers 91 and 92, and the other end to the junction of two resistors 87 and 88, the other ends of which are connected to lines $b$ and $a$ respectively, through the transformers. The resistors 87 and 88 are so proportioned that the phase of the current in the field coils is in time quadrature with that of the current in the movable coil circuit 81 when no ground exists, and under this condition, therefore, no deflection of the movable coil occurs. Likewise in instrument 77 one end of the field coils 85, 86 is connected to line $c$ through the transformers, and the other end to the junction of the two resistors 89 and 90, the other ends of which are connected to lines $a$ and $b$ respectively through the transformers. The resistors 89 and 90 are so proportioned that the phase of the current in the field coils 85, 86 is in time quadrature with that in the movable coil circuit 82. These phase relations are shown in Figs. 15 and 16 which correspond to instruments 76 and 77 respectively, and in which the circuits are numbered to correspond to the instrument circuits. The values of these resistors to produce the quadrature relations referred to may be readily obtained by the well known Kirchoff's laws, using symbolic or vector algebra, or may be obtained experimentally during the process of adjusting the instruments.

Transformers are shown in the diagram as a means of connecting the circuits just described to the lines. These however, are not essential to the theory of operation of the instrument, as the circuits having the proper resistance may be connected directly to the lines provided the insulation of the instrument has sufficient strength to stand the direct line voltage. Further, the movable coil and field coils in each instrument may be interchanged without affecting the theory of operation.

Referring to the vector diagrams Fig. 15 and Fig. 16, it is understood that under normal conditions, when no ground exists on the lines the currents in the field coils and movable coil are in time quadrature as has already been stated which is indicated in Fig. 15 by the vector $cN'$ being perpendicular to the vector $Nb$, and Fig. 16 by the line $cN''$ being perpendicular to $Na$. When a line is grounded say in line $b$, as indicated at $G_1$, the ground resistance is in parallel to the resistor 79 which alters the phase relations of the currents in the net work 78, 79, 80, and it can be shown that if these circuits are non-inductive, a ground on $b$ results in merely shifting the neutral point N along the line $Nb$ until for a dead ground N coincides with $b$; that is the phase of the current in $Nb$, the current in the movable coil 81, remains unaltered, and no deflection of the movable coil results in instrument 76, since the quadrature relation is maintained. In practice the circuits 79 and 80 contain some self inductance, but the time constants can be made so small that the change in phase of the current in the circuit between neutral and the grounded line under the conditions just referred to can be neglected for all practical purposes. In instrument 77, the changed phase relations result in a deviation from the quadrature relation between the currents in the field and movable coils which produces a deflection of the movable coil and of the pointer attached to it. These coils are so wound that this deflection is toward the part of the scale marked B indicating a ground on line $b$.

In a similar manner if line $a$ is grounded the neutral point N shifts along the line N$a$, without changing the phase relation in the movable coil 82 of instrument 77 and therefore no deflection of the movable coil in this instrument results. In instrument 76 the change from quadrature relations of currents in field and movable coils results in a deflection of the movable coil and its pointer and by proper design of windings this deflection is toward the part of the scale marked A indicating that line $a$ is grounded. If line $c$ is grounded then the neutral point N shifts toward $c$ resulting in a variation from the quadrature relation of the currents in field and movable coils in both instruments, and the vector relations and coil windings are such that in both instruments a deflection of the pointers results toward the parts of their scales marked C indicating that line $c$ is grounded.

I do not limit myself to the particular method just described for obtaining the quadrature relations between the currents in the field and movable coils. For instance this relation may be obtained as shown in Fig. 17, and the accompanying circuit and vector diagram Fig. 18. This arrangement operates in a manner exactly similar to the one just described for Fig. 14; differing in construction only in that the quadrature relation for both instruments is obtained from a single net work of resistors, instead of an independent net work for each instrument. Referring to Fig. 17 and Fig. 18, this net work consists of resistors 91, 92 including movable coil 93, 94 including movable coil 95, 96 and 97, so proportioned that the phase of the current in 92 is in time quadrature with that in the field coils 98, 99, of instrument 102. Also, the phase of the current in 94 is in time quadrature with that in the field coils 100, 101, of instrument 103. As stated above the operation in indicating a ground is the same as for the arrangement shown in Fig. 14. The movable and field coils may be interchanged as before without altering the theory of the instrument.

The instruments so far described are applied to circuits which were not normally grounded and in these instruments an artificial neutral was provided. As a ground occurred somewhere in the line, the neutral shifted according to the location of the ground and thereby a change of the phase relations took place with a consequential resultant torque in one or both instruments.

In a three phase system with a grounded neutral, an artificial neutral formed by three resistors cannot be made to shift, as is the case with the ungrounded neutral for the reason that the values of the line potentials are maintained constant above ground by the generator. The same method, therefore, as described for use with ungrounded three phase circuits will not operate on circuits with grounded neutrals.

The method which is proposed for this system is to use electrodynamometer instruments, the indications of which will be a measure of the leak or current passing to ground through the fault and neutral connection to ground, and simultaneously indicate by a selective property, which of the lines is at fault. For convenience and as distinction over the before-described form of ground detector, I term the instruments applied to grounded circuits "leakage indicators".

The method which is proposed for this system is to connect electrodynamometer instruments so in a circuit that the indications will be a direct function of the leak or current passing to ground through the fault and neutral connection to ground, and simultaneously indicate by a selective property, which line is at fault.

Two instruments are necessary to give complete information. These, however, may be contained in the same case, if desired. In Figure 19, the field coils 105, 106, 107 and 108, of heavy wire, are connected in series with the grounding connection 113, either directly, as shown, or through current transformer. The movable coils 109 and 110 are connected in series with resistors 111 and 112 respectively. The circuit containing coil 109 and resistor 111 is connected across lines $a$, $c$ while the coil 110 and resistor 112 are connected across lines, $b$, $c$, directly or through potential transformers 114 and 115, as shown.

When a ground exists, say at $G_1$ on the line $b$ the current passing through the fault to ground is in general in phase coincidence with the phase voltage between the line $b$ and the grounded neutral N. This current passes through the field coils of both instruments. In instrument 116 the current in the movable coil, being in phase with voltage across $a$ $c$ is in quadrature with the leak current passing through its field and therefore no deflection occurs. In instrument 117 however, the current in the movable coil, being in phase with the voltage across $b$ $c$ has a component in phase with the leak current due to the ground on line $b$ and therefore a deflection occurs on instrument 117. In a similar manner, if line $a$ is grounded, no deflection occurs on instrument 117, but instrument 116 indicates the leak in $a$.

When line c is grounded, both instruments simultaneously indicate that leak in a manner previously described.

These relations are shown by reference to the circuit and vector diagram in Figure 20, it is seen that the voltages in the arms $aN$ and $bN$ and $cN$ are in quadrature with the voltages across lines $cb$ and $ac$ and $ab$ respectively. Arm $ac$ contains the coil 109 and arm $bc$ the coil 110, while the coils 105, 106 and 107, 108 are in series with the ground connection NG. When a ground occurs, say at $G_1$ in line $b$ the current flowing through the fault and the ground connection is in phase with the phase voltage $bN$. This phase voltage being in quadrature with the voltage across lines $ac$ the ground current will not react on the current flowing through coil 109 to produce a torque. However, the current flowing through coil 110 has a component in phase with the leak current passing through the field coils and reacts thereon to indicate the leak, by causing a deflection of the movable coil.

For determining a leak in a two phase three wire circuit with grounded neutral only one instrument is necessary. In Fig. 21 the field coils are again in series with the line 120 to ground between the neutral point N and G. The movable coil 121 circuit is energized by the voltage between lines $ab$ either directly or through a transformer. In the Fig. 21 two transformers 124 and 125 are shown simply to indicate how the same transformers usually employed for the other instruments on the board, such as wattmeters, power factor meters, etc. may also be used for the ground detector.

When both lines are perfectly insulated, no leak current passes through the field coils of the instrument and consequently no deflection occurs. When one line, say line $b$ is grounded, as indicated at $G_1$, the current leaking to ground has a component in phase with the current flowing in the movable coil and a deflection results toward one end of the scale, say toward the end marked B. When a leak occurs in line $a$ the leak current will again be in phase with a component of the current flowing through the movable coil and produce a deflection to the other end of the instrument, marked A. It will be noted by reference to Fig. 22 that the phase relations are such that the current in the field coils is in phase with a component of the current in the movable coil, when the leak occurs in one line, and in phase opposition thereto when the leak occurs in the other line. While the torque effect is the same for equal grounds, the direction of the torque is reversed thereby and the needle swings in opposite directions, as explained.

In place of a single instrument, I may use two instruments similar to the three phase method. In Fig. 23 I have shown the field coils 125, 126, 128, 129 of the two instruments connected in series with line to the ground as before. The movable coil 127 of instrument 131 is connected across lines $cc$ while the movable coil 130 of instrument 132 is connected across lines $bc$.

Assuming that line $b$ be grounded, as indicated by $G_1$, the current passing to ground is in general in phase with the voltage in the arm $bc$. The currents in the field coils 128, 129 and the movable coil 130 in the instrument 132 therefore have components in phase while the currents in the field coils 125, 126 and the movable coil 127 in instrument 131 are in quadrature. The instrument 132 will therefore indicate the leak in line $b$. When the leak occurs in line $a$, the leak current will necessarily be in phase with the phase voltage in arm $ac$ and therefore have components in phase with current flowing through the movable coil 127 in instrument 131. Instrument 131 will therefore indicate the leak in line $a$.

While the derivation of the operating currents for the field coils and movable coils differ in the use of the instruments as ground detectors and leakage indicators, the common basis is the use of the electrodynamometer type of instrument for accurately indicating incipient grounds by relatively large deflections on substantially linear scale and by its selective action indicates which line is grounded, which is accomplished by utilizing the reactions between currents in field and movable coils arising from various phase relations between them, or by the differential action of currents in two sections of the field coil acting upon current in the movable coil, or by a combination of both.

The invention is not limited to particular methods used to obtain quadrature currents for the selective operation of the instruments. The particular methods described are simply referred to as some of the most convenient, since they utilize the various simple phase relations which exist in and are natural to the circuits themselves. The quadrature currents, instead of being obtained from the natural phase relations in the circuits, may be obtained artificially by advancing or retarding the phase of the currents desired by means of condensers or reactors, so as to produce the quadrature relation.

In the foregoing description for the sake of simplicity and clearness I have shown the instruments as having a magnetic circuit of air through which currents in the two coils act upon each other. I do not limit myself, however, to this particular form of instrument. It may have a magnetic circuit of iron or other material as is well understood. Further, I may use an instrument of the so called induction type similar to the well-known rotating disc watt-hour meter element. I may have contact arms attached to the movable elements of the instruments, instead of the pointer, or in combination with the pointer, which contact arms are capable of making contact to one or the other of two outside electrical circuits depending upon the direction of motion of the movable element, which circuits can be made to actuate an annunciator to show which line is grounded. Furthermore, I may utilize the contact making feature for actuating protective devices to open or otherwise protect a grounded line.

I claim:—

1. In a ground detector for an alternating current circuit, the combination of two relatively movable windings constructed and arranged to electrodynamically react upon each other, and means for connecting the windings to the circuit and ground so that in the absence of a ground on the circuit the windings assume a definite relative position and that when a ground occurs on the circuit, the relative position of the coils is changed.

2. In a ground detector for an alternating current circuit, the combination of two relatively movable windings constructed and arranged to electrodynamically react upon each other, connections for energizing one of the windings from the circuit and connections including a ground connection for energizing the other winding when a ground occurs on the circuit.

3. In a ground detector for an alternating current circuit, the combination of two relatively movable windings constructed and arranged to electrodynamically react upon each other, resistors connected at one end to different line wires and interconnected at their other ends to define a neutral point, connections for energizing one winding from the circuit and connections including the neutral point and ground for energizing the other winding when a ground occurs on the circuit.

4. In a ground detector for an alternating current circuit, comprising a plurality of stationary coils and a movable coil, connections between the circuit, the coils and ground so arranged that in the absence of a ground on the circuit the movable coil is maintained in a definite position relative to the other coils and that when a ground occurs on the circuit, the said position is changed.

5. A ground detector for an alternating current circuit, comprising a movable element, a stationary winding and a coil carried by the movable element, the winding and the coil being arranged to electrodynamically react upon each other, resistors interconnected and connected to the line to define a neutral point, connections for connecting the winding and the coil to different points of the circuit, the arrangement being such that the coil is normally maintained in a definite position relatively to the stationary winding, and a ground wire so connected with the said connections that in the absence of a ground on the circuit it has no effect on the position of the coil and that as soon as a ground occurs on the line the position of the movable coil is changed.

6. A ground detector for an alternating current circuit, comprising an electrodynamometer, means including resistors adapted to be connected to the line wires and defining an artificial neutral point, one coil of the dynamometer being energized by the circuit and the other coil having connection to the line wires and forming part of a circuit including the said neutral point and ground.

7. Apparatus for indicating grounds on an A. C. circuit, comprising a movable element and two windings arranged to electrodynamically react upon each other, one of the windings being carried by the movable element, means for energizing one of said windings from the circuit and means for connecting the second winding between the ground and the circuit so as to cause the ground current to flow therethrough and react upon the current in the first winding.

8. A ground detector for an alternating current circuit, comprising two stationary coils spaced in axial alignment, a coil pivotally mounted in the space between the stationary coils, connections between the coils the circuit and ground so arranged that in the absence of a ground on the circuit the movable coil assumes a definite position and that when a ground occurs, the movable element will swing to one side or the opposite side respectively according to which of two line wires is grounded.

9. In a ground detector for alternating current circuits having three line wires, the combination of two sets of coils comprising each two stationary coils spaced in axial alignment and a movable coil pivotally mounted between the stationary coils, and connections between the two sets of coils, the circuit and ground so arranged that in the absence of a ground on the circuit the movable coils assume a definite normal position relatively to the respective stationary coils, that when a ground occurs on either one of two of the lines, the position of one movable coil will be changed respectively and when a ground occurs on the remaining line the position of both movable coils will be changed.

10. Apparatus for selectively indicating grounds on the lines of a polyphase A. C. circuit, comprising a plurality of units each including a movable element and two windings capable of causing, by their mutual action, motion of the said element and means for connecting the windings to the circuit and to ground so that in the absence of a ground on any of the lines of the circuit the movable elements of the different units will remain stationary and that as soon as a ground occurs on any of the lines the movable element of at least one of the said units will move to indicate the ground.

11. Apparatus for indicating grounds on the lines of a polyphase A. C. circuit, comprising a plurality of units each including a movable element and a plurality of windings capable of causing by their mutual action motion of the movable element, a ground connection and means for establishing connections between the different lines of the circuit, the windings and the ground connection so that in the absence of a ground on any of the lines the effects of the currents flowing through the windings neutralize each other and that when a ground occurs the effects of the currents flowing through the windings cause motion of the movable element of at least one of said units to indicate the ground.

12. Apparatus for indicating grounds on a polyphase A. C. circuit comprising an electrodynamometer having a plurality of stationary windings and a movable winding, means for energizing one set of said windings from the circuit, a plurality of resistors, a ground connection and means for interconnecting different lines of the circuit, the second set of said windings and the ground connection so that in the absence of a ground the effects of the currents flowing through the windings neutralize each other and that when a ground occurs, the effects of the currents flowing through the windings cause motion of the movable winding in one direction or opposite direction according to which line is grounded.

In testimony whereof, I affix my signature

WILLIAM NELSON GOODWIN, Jr.